United States Patent [19]

Hirohata

[11] Patent Number: 4,810,147

[45] Date of Patent: Mar. 7, 1989

[54] FASTENER FOR PLATES

[75] Inventor: Toshio Hirohata, Yokohama, Japan

[73] Assignee: Nifco Inc., Yokohama, Japan

[21] Appl. No.: 96,045

[22] Filed: Sep. 11, 1987

[30] Foreign Application Priority Data

Sep. 30, 1986 [JP] Japan .................. 61-232703

[51] Int. Cl.[4] .................. F16B 21/00; F16B 37/12
[52] U.S. Cl. .................. 411/349; 411/438;
411/508; 411/913; 174/138 D; 24/453
[58] Field of Search .................. 411/103, 105, 107, 112,
411/113, 174, 175, 349, 421, 437, 438, 398, 552,
549, 553, 554, 508–510, 401; 174/138 D;
403/408.1; 24/112, 297, 453, 590

[56] References Cited

U.S. PATENT DOCUMENTS

| 988,743 | 4/1911 | Stillwaggon | 411/107 X |
|---|---|---|---|
| 2,563,976 | 8/1951 | Torosian | 411/544 |
| 3,413,019 | 11/1968 | Dyck | 411/401 X |
| 3,860,999 | 1/1975 | Moyer | 411/349 X |
| 4,629,356 | 12/1986 | Hayashi | 403/408.1 |

FOREIGN PATENT DOCUMENTS 2230233 12/1974 France .................. 411/103

Primary Examiner—Neill R. Wilson
Attorney, Agent, or Firm—Trexler, Bushnell, Giangiorgi & Blackstone, Ltd.

[57] ABSTRACT

A fastener for plates includes a leg portion for engaging with a first mounting plate, a flange portion integrally secured to the leg portion, a head portion projecting from the flange portion for holding a second mounting plate between the flange portion and the head portion, a cut-away portion formed by cutting away part of the head portion from its outer periphery towards its axis for allowing the head portion to be inserted into a mounting hole of a second mounting plate by a rotating action, and a resilient portion for pressing against the inner periphery of the mounting hole of the second mounting plate which is secured by the flange portion.

3 Claims, 2 Drawing Sheets

FASTENER FOR PLATES

BACKGROUND OF THE INVENTION

1. Field of the Invention

This invention relates to a fastener for plates effective for use, for example, in mounting a trim board on the inner surface of a vehicle passenger compartment.

2. Prior Art Statement

A commonly used conventional fastener for mounting a vehicle trim board comprises a head portion and a leg portion projecting from the head portion. The trim board is secured to an inner wall of the passenger compartment by mounting the head portion on the trim board and engaging the leg portion in a mounting hole formed in the inner wall of the vehicle.

Referring to FIG. 1, in a known structure for mounting a fastener on a trim board, a trim board 10 is provided with a first hole 11 having a large diameter and a second hole 12 having a small diameter, the first and second holes being communicated with each other.

In mounting the conventional fastener on the trim board 10, the head portion is once inserted in the first large hole 11, and is then moved into the second hole 12 along the outer surface of the trim board 10 thereby to permit the head portion to be retained by the trim board 10.

However, this structure for mounting a fastener to a trim board has a shortcoming in that complicated machining is required to make the special configurations of the mounting holes 11 and 12. Furthermore, since it is difficult to tightly mount the head portion of the fastener in the small hole 12, play is likely to occur between the fastener and the trim board. The result is that the head portion of the fastener may accidentally move from the small hole 12 to the large hole 11 and become detached from the large hole 11. When this happens, the trim board 10 mounted on the inner surface of the passenger compartment comes loose and may, in some cases, become completely detached and fall off the inner wall when subjected to a shock. In addition, since the large hole 11 remains open after the trim board is mounted, dust etc. is likely to enter through the large hole 11.

Japanese Utility Model Publication No. 47-39170 discloses a fastener for mounting a trim board, in which the head portion has a special configuration and is mounted on the trim board with a rotating action. However, the overall configuration of the fastener is complicated and play between the trim board and the fastener is not eliminated.

OBJECT AND SUMMARY OF THE INVENTION

The present invention was accomplished in view of the above-mentioned facts. It is therefore an object of the present invention to provide a fastener for plates which permits a second mounting plate (trim board) to be simple in the configuration of its mounting hole, the fastener to be tightly mounted on the second mounting plate without play therebetween, and dust etc. to be prevented from reaching the inner side of the second mounting plate from the mounting hole of the second mounting plate after the second mounting plate is mounted on a first mounting plate (inner surface of a passenger compartment).

A fastener for plates according to the present invention comprises a leg portion for engaging with a first mounting plate, a flange portion integrally secured to the leg portion, a head portion projecting from the flange portion for holding a second mounting plate between the flange portion and the head portion, a cut-away portion formed by cutting away part of the head portion from its outer periphery towards its axis for allowing the head portion to be inserted into a mounting hole of the second mounting plate by a rotating action, and a resilient portion for pressing against an inner periphery of the mounting hole of the second mounting plate which is secured to the flange portion.

In the above-mentioned fastener for plates, the head portion is brought to be in alignment with the mounting hole of the second mounting plate and is inserted into the mounting hole from the cut-away portion first, and is then rotated, generally by one turn, around its axis. As a result, the head portion is allowed to penetrate through the mounting hole of the second mounting plate and to project from the opposite side, and the second mounting plate is held between the head portion and the flange portion. By this, the fastener is mounted on the second mounting plate. In the foregoing state where the fastener is mounted on the second mounting plate, the resilient portion is disposed in the mounting hole of the second mounting plate. Therefore, no play arises in the radial direction of the mounting hole of the second mounting plate because the inner periphery of the mounting hole is pressed by the resilient force of the resilient portion. When the leg portion is inserted into and engaged with the first mounting plate after the fastener is mounted on the second mounting plate, the second mounting plate can be mounted on the first mounting plate.

Other objects and features of the present invention will become apparent from the following description with reference to the accompanying drawings.

DETAILED DESCRIPTION OF THE PREFERRED EMBODIMENTS

Figure 1:
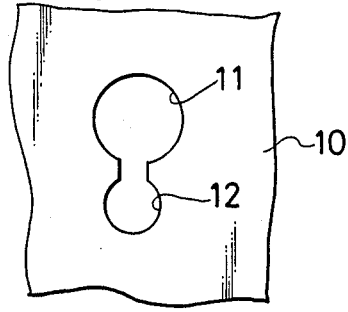
FIG. 1 is a plan view of a trim board formed having holes for mounting a conventional fastener.
Figure 2:
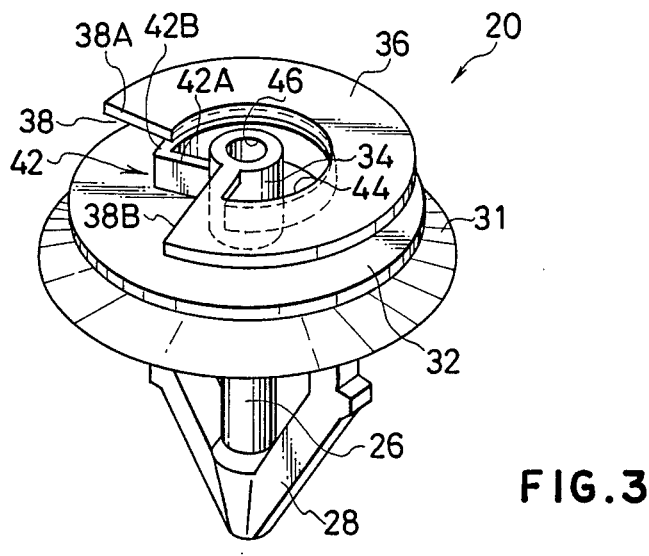
FIG. 2 is a perspective view showing one embodiment of a fastener for plates according to the present invention.
Figure 3:
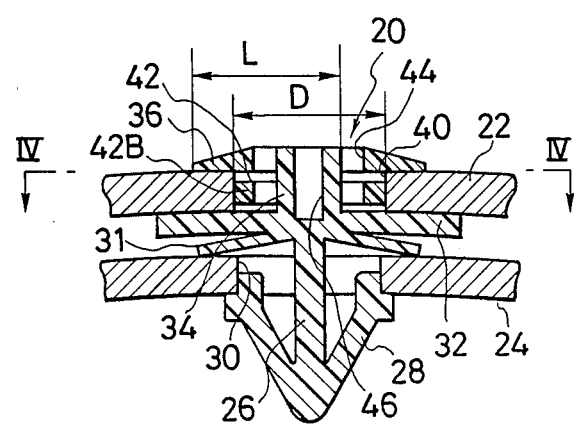
FIG. 3 is a sectional view showing the fastener of FIG. 2 as used to mount a trim board.

FIGS. 2 through 5 illustrate a first embodiment of a fastener 20 according to the present invention. As is shown in FIG. 3, the fastener 20 is employed for mounting a trim board 22 on an inner panel 24 of a vehicle passenger compartment. In this specification, the inner panel 24 and the trim board 22 are at times referred to as the first and second mounting plates, respectively.

The fastener 20, as shown in FIGS. 2 and 3, is formed at one end thereof with a rod-like leg portion 26. The leg portion 26 is formed at a tip end portion thereof with an anchor portion 28 which can be brought into press engagement with an engaging hole 30 formed in the inner wall 24 of the vehicle. The leg portion 26 is coaxially formed on a base portion thereof with an umbrella-shaped skirt portion 31 and a thin disk-shaped flange portion 32. The skirt portion 31 is thin and able to flexibly deform in the axial direction of the leg portion 26. The skirt portion 31 is abutted against an outer surface of the inner panel 24 thereby to firmly hold the inner panel 24 between the anchor portion 28 and the skirt portion 31. The flange portion 32 is coaxially formed with a shaft portion 34 projecting in the opposite direction to the leg portion 26. The shaft portion 34 is coaxially formed at the top end thereto with a thin disk-shaped head portion 36.

The head portion 36 is formed with a cut-away portion 38 which extends over 90° about the axis when viewed from the axial direction. More specifically, the head portion 36 is cut away such that a sector-shaped space is formed between one cut-away end face 38A and the other cut-away end face 38B.

Figure 5:
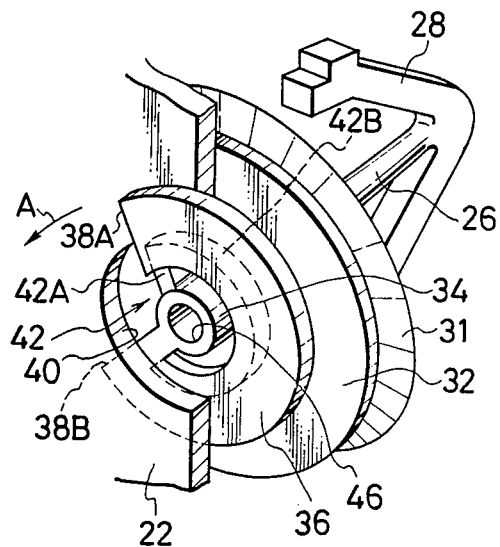
FIG. 5 is a perspective view showing the steps for mounting the fastener of FIG. 1 on a trim board.

The head portion 36 is formed such that the length L (see FIG. 3) from the outer circumference thereof to the outer circumference of the shaft portion 34 via the axis is smaller than the inner diameter D of a circular mounting hole 40 formed in the trim board 22. Therefore, as shown in FIG. 5, when the head portion 36 is rotated by approximately one full turn about the shaft portion 34 in the direction as shown by the arrow A in FIG. 5 after the head portion 36 is inserted into the mounting hole 40 from the cut-away end face 38A first, the head portion 36 is spirally moved through the mounting hole 40 and caused to project from the other side. By this, the flange portion 32 comes to face one surface of the trim board 22, while the head portion 36 comes to face the other surface, so that the trim board 22 is held between the head portion 36 and the flange portion 32.

Figure 4:
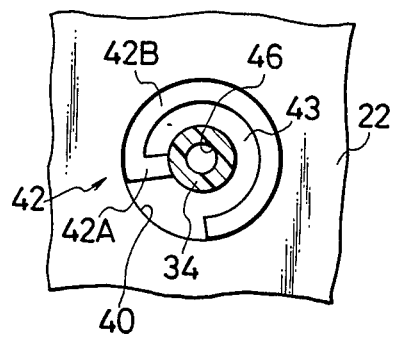
FIG. 4 is a sectional view taken along line IV—IV of FIG. 3.

A resilient portion 42 is formed between the head portion 36 and the flange portion 32. As shown in FIG. 4, the resilient portion 42 includes a radial portion 42A projecting in the radial direction from the shaft portion 34, and an arcuate portion 42B encircling the shaft portion 34 by about ¾ of a full circle with a space 43 left between the front end of the radial portion 42A and the shaft portion 34.

The radial portion 42A is positioned immediately under the cut-away end face 38A when viewed from the axial direction of the head portion 36. As shown in FIG. 5, when the head portion 36 is inserted into the mounting hole 40 of the trim board 22, the radial portion 42A moves smoothly into the mounting hole 40 together with the head portion 36. By this, the arcuate portion 42B is also smoothly inserted into the mounting hole 40. As a result, when being inserted into the mounting hole 40, the resilient portion 42 is rotated counterclockwise in FIG. 4.

The radial portion 42A and the arcuate portion 42B are comparatively small in sectional dimension and are resilient. The outer diameter of the arcuate portion 42B is larger than the inner diameter D (see FIG. 3) of the mounting hole 40 of the trim board 22. As shown in FIG. 5, when the head portion 36 is inserted into the mounting hole 40 of the trim board 22 and rotated by approximately one full turn about the shaft portion 34, the arcuate portion 42B is inserted into the mounting hole 40 while pressing the inner periphery of the mounting hole 40, whereas when the entire head portion 36 penetrates through the mounting hole 40, the arcuate portion 42B presses the inner periphery of the mounting hole 40 to absorb play between the shaft portion 34 and the trim board 22.

The head portion 36 is formed therein with a lightening (weight-reduction) hole 44 extending about the shaft portion 34 by about ¾ of a full circle from one cut-away end face 38A to the vicinity of the other cut-away end face 38B. The lightening hole 44 corresponds to the space 43 (see FIG. 4) between the head portion 36 and the shaft portion 34 when viewed from the axial direction of the head portion 36. The lightening hole 44 is formed as a space for inserting a core when molding the resilient portion 42. The shaft portion 34 is formed with a lightening (weight-reduction) hole 46 reaching a predetermined depth from the side of the head portion 36.

The steps for mounting the trim board 22 on the inner panel 24 of the vehicle will be described next.

The fastener 20 is mounted on the trim board 22 first. In order to mount the fastener 20 on the trim board 22, the fastener 20 is placed on one side of the trim board 22 and thereafter, as shown in FIG. 5, the head portion 36 is inserted into the mounting hole 40 from the cut-away end face 38A first and is rotated by about one turn in the direction shown by the arrow A of FIG. 5. As a result, the head portion 36 is spirally advanced through the mounting hole 40 to a state where it holds the trim board 22 between the flange portion 32 and itself. At the same time, the resilient portion 42 is inserted into the mounting hole 40 together with the shaft portion 34. By this, the fastener 20 is mounted on the trim board 22.

When the fastener 20 is mounted on the trim board 22, the arcuate portion 42B of the resilient portion 42 is in pressure abutment with the inner periphery of the mounting hole 40 of the trim board 22 absorbs play between the shaft portion 34 and the inner periphery of the mounting hole 40. As a result, the fastener 20 is restricted from movement in the radial direction of the mounting hole 40, i.e., the left and right direction of FIG. 3.

Furthermore, the fastener 20 is safe from being accidentally detached from the trim board 22 and will remain mounted thereon until the head portion 36 is intensionally inserted into the mounting hole 40 from the cut-away end face 38A or cut-away end face 38B side and rotated. Thus, the fastener 20 is firmly mounted on the trim board 22. The mounting hole 40 of the trim board 22 is blocked by the head portion 36 and the flange portion 32 from opposite sides thereof.

In this way, after the fastener 20 is mounted on the trim board 22, the leg portion 26 of the fastener 20 is press-fitted into the engaging hole 30 of the inner panel 24 of the vehicle passenger compartment. As a result, the inner panel 24 is caught between the anchor portion 28 and the skirt portion 31. By this, the trim board 22 is mounted on the inner panel 24 as shown in FIG. 3.

When the trim board 22 is mounted on the inner panel 24, since the mounting hole 40 of the trim board 22 is blocked by the head portion 36 and the flange portion 32 at opposite sides thereof, dust etc. cannot enter the space between the trim board 22 and the inner panel 24 through the mounting hole 40. Since the fastener 20 is safe from being accidentally detached from the trim board 22, it is highly resistant against shock etc., too. Moreover, since the fastener 20 is tightly mounted on the trim board 22 by the resilient portion 42, the trim board 22 is restricted from movement with respect to the inner panel 24.

Figure 7:
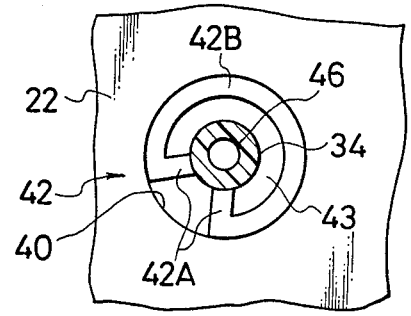
FIG. 7 is a sectional view taken along line VII—VII of FIG. 6.

In the above-mentioned embodiment, the arcuate portion 42B of the resilient portion 42 is connected only at one end thereof with the shaft portion 34 through the radial portion 42A. Alternatively, as shown in FIG. 7, the arcuate portion 42B may be connected at both ends thereof with the shaft portion 34 through two radial portions 42A.

Figure 6:
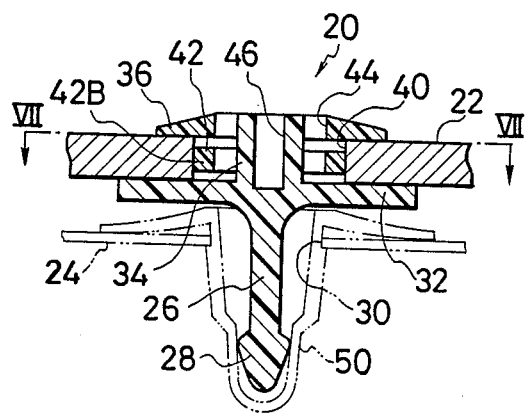
FIG. 6 is a sectional view showing another embodiment of a fastener according to the present invention, in which the fastener is being used to mount a trim board.

Furthermore, in the above-mentioned embodiment, the fastener 20 is provided at the leg portion 26 with the anchor portion 28, so that the leg portion 26 is directly engaged with the inner panel 24 through the anchor portion 28. Alternatively, as shown in FIG. 6, the fastener 20 may be provided with a female member 50, so that the fastener 20 is engaged with the inner panel 24 by inserting the leg portion 26 into the female member 50.

As described in the foregoing, in the fastener according to the present invention, even if the mounting hole of the trim board is round, the fastener can be tightly mounted because of the presence of the resilient portion. Moreover, since the mounting hole is blocked by the head portion and the flange portion from opposite sides thereof, dust etc. can be prevented from reaching the inner side of the trim board.

What is claimed is:

1. A fastener for plates comprising
   a leg portion for engaging with a first mounting plate;
   a flange portion integrally secured to said leg portion;
   a head portion projecting from said flange portion for holding a second mounting plate between said flange portion and said head portion;
   a cut-away portion formed by cutting away part of said head portion from its outer periphery towards its axis for allowing the head portion to be inserted into a mounting hole of said second mounting plate by a rotating action; and
   a resilient portion extending from a portion of said leg between said flange and head portions, said resilient portion including an arcuate portion extending circumferentially around said leg portion in spaced relationship thereto and being radially collapsible toward said leg portion for pressing against an inner periphery of said mounting hole of said second mounting plate which is secured to said flange portion.

2. A fastener for plates comprising
   a leg portion for engaging with a first mounting plate;
   a flange portion integrally secured to said leg portion;
   a head portion projecting from said flange portion for holding a second mounting plate between said flange portion and said head portion;
   a cut-away portion formed by cutting away part of said head portion from its outer periphery towards its axis for allowing the head portion to be inserted into a mounting hole of said second mounting plate by a rotating action;
   a resilient portion for pressing against an inner periphery of said mounting hole of said second mounting plate which is secured to said flange portion; and
   said resilient portion comprising a radial portion projecting from a shaft portion connecting said flange portion and said head portion together, and an arcuate portion formed around said shaft portion from the distal end of said radial portion.

3. The fastener as claimed in claim 2, wherein said leg portion is provided at a tip end thereof with an anchor portion.

* * * * *